(12) United States Patent
Symonds

(10) Patent No.: US 9,979,281 B2
(45) Date of Patent: May 22, 2018

(54) APPARATUS AND METHOD FOR DYNAMIC ADJUSTMENT OF THE BANDWIDTH OF A POWER CONVERTER

(71) Applicant: Excelitas Technologies Corp., Waltham, MA (US)

(72) Inventor: Neil Symonds, Julian, CA (US)

(73) Assignee: Excelitas Technologies Corp., Waltham, MA (US)

( * ) Notice: Subject to any disclaimer, the term of this patent is extended or adjusted under 35 U.S.C. 154(b) by 0 days. days.

(21) Appl. No.: 15/288,063

(22) Filed: Oct. 7, 2016

(65) Prior Publication Data

US 2018/0102703 A1    Apr. 12, 2018

(51) Int. Cl.
*H02M 3/04*    (2006.01)

(52) U.S. Cl.
CPC .................... *H02M 3/04* (2013.01)

(58) Field of Classification Search
CPC ........................................ H02M 3/04
See application file for complete search history.

(56) References Cited

U.S. PATENT DOCUMENTS

| 6,084,786 | A  | * | 7/2000  | Rozman        | H02M 1/12    |
|-----------|----|---|---------|---------------|--------------|
|           |    |   |         |               | 363/48       |
| 6,097,564 | A  | * | 8/2000  | Hunter        | G11B 21/083  |
|           |    |   |         |               | 360/78.04    |
| 6,370,459 | B1 | * | 4/2002  | Phillips      | B62D 5/0436  |
|           |    |   |         |               | 180/443      |
| 6,396,881 | B1 | * | 5/2002  | White         | H03D 1/2245  |
|           |    |   |         |               | 375/321      |
| 7,279,972 | B2 | * | 10/2007 | Smithson      | H03F 1/3247  |
|           |    |   |         |               | 330/149      |
| 7,733,678 | B1 | * | 6/2010  | Notohamiprodjo| H02M 1/4225  |
|           |    |   |         |               | 323/222      |
| 2004/0085785 | A1 | * | 5/2004  | Taimela    | H02J 3/32    |
|           |    |   |         |               | 363/37       |
| 2005/0122241 | A1 | * | 6/2005  | Magrath     | H03F 3/217   |
|           |    |   |         |               | 341/76       |
| 2005/0131557 | A1 | * | 6/2005  | Moussaoui   | G05B 13/048  |
|           |    |   |         |               | 700/28       |
| 2008/0316779 | A1 | * | 12/2008 | Jayaraman   | H02M 1/4225  |
|           |    |   |         |               | 363/74       |
| 2009/0108891 | A1 | * | 4/2009  | Sander      | H03L 7/085   |
|           |    |   |         |               | 327/156      |
| 2009/0280758 | A1 | * | 11/2009 | Pratt       | H03G 3/3047  |
|           |    |   |         |               | 455/127.2    |

(Continued)

*Primary Examiner* — Yusef A Ahmed
(74) *Attorney, Agent, or Firm* — Peter A. Nieves; Sheehan Phinney Bass & Green PA

(57) ABSTRACT

A power converter is configured to increase bandwidth in response to a magnitude of the difference between the target output voltage and the actual output voltage. The converter includes a subtractor to receive a reference voltage and a scaled output as inputs, configured to produce an error as output, a functional block configured to receive the error as input and to produce a functional block output, a first multiplier configured to receive the functional block output and scale the functional block output by a first loop constant, and a second multiplier configured to receive the functional block output and scale the functional block output by a second loop constant. The functional block is configured to increase the error value fed to the first multiplier and the second multiplier by a factor f(x).

16 Claims, 16 Drawing Sheets

(56) References Cited

U.S. PATENT DOCUMENTS

| | | | | |
|---|---|---|---|---|
| 2011/0043160 A1* | 2/2011 | Serban | ............... | G05F 1/67 320/101 |
| 2012/0049908 A1* | 3/2012 | Karlsson | ............... | H02M 3/157 327/154 |
| 2012/0200331 A1* | 8/2012 | Karlsson | ............... | H02M 3/156 327/175 |
| 2013/0129114 A1* | 5/2013 | Lesso | ............... | H03L 7/08 381/98 |
| 2015/0102674 A1* | 4/2015 | Rudolph | ............... | H02J 3/381 307/52 |
| 2015/0146458 A1* | 5/2015 | Lim | ............... | H02M 3/158 363/44 |
| 2015/0280597 A1* | 10/2015 | Takase | ............... | H02M 1/12 323/271 |
| 2016/0036319 A1* | 2/2016 | Katsumata | ............... | H02M 1/14 363/126 |
| 2016/0164400 A1* | 6/2016 | Rinne | ............... | H02M 3/157 323/234 |
| 2016/0164407 A1* | 6/2016 | Wu | ............... | H02M 3/156 323/282 |
| 2016/0344281 A1* | 11/2016 | Choudhury | ............... | H02M 1/4225 |
| 2016/0344538 A1* | 11/2016 | Moehlmann | ............... | H03L 7/093 |
| 2016/0352216 A1* | 12/2016 | Sonnaillon | ............... | H02M 1/4208 |
| 2017/0222558 A1* | 8/2017 | Tajima | ............... | H02M 1/08 |

* cited by examiner

APPARATUS AND METHOD FOR DYNAMIC ADJUSTMENT OF THE BANDWIDTH OF A POWER CONVERTER

FIELD OF THE INVENTION

The present invention relates to power converter, and more particularly, is related to controlling bandwidth of a power converter.

BACKGROUND OF THE INVENTION

A typical power converter may employ a closed loop controller to regulate its output voltage within specified bounds. Such a power converter generally employs a closed-loop current mode controller, as shown by FIG. 1, in which an output voltage is sampled, compared to a stable reference voltage to develop an error signal, and processes this error signal to produce a current command that is sent to the power stage of the converter, which converts this command into an output current. The processing of the error signal has traditionally been performed by analog circuitry in the frequency domain, and is designed so that the power converter exhibits a desired closed loop bandwidth that will meet the required dynamic response characteristic to load current changes. This processing may also be performed by firmware running in a microcontroller; the output voltage is conditioned by analog circuits and then sampled at a fixed rate and converted to a digital value that is compared to a reference value to develop an error value. This error value is processed by a proportional-integral-differential (PID) controller to produce the current command, which is converted back to an analog signal for use by the power stage as previously described. The control loop in this instance does not benefit from the differential portion of the PID controller, therefore it is omitted in subsequent references, and herein the controller will be referred to as a proportional-integral (PI) controller. The digital processing offers the ability to incorporate additional features that may be impractical to implement in analog circuitry.

FIG. 1 is a diagram showing the functions performed in a typical prior art control loop. The output voltage of the power converter, in general, may be scaled to match the input voltage range of the small-signal circuits that are included in the PI controller (proportional-integral controller); this scaled signal is labeled Vout SCALED in FIG. 1. In an analog implementation, the functions may be implemented using, for example, a stable voltage reference microcircuit, operational amplifiers and discrete resistors and capacitors, in a manner that is well known. In a digital implementation, Vout SCALED may be converted to a digital value by an analog-to-digital converter and the data in the controller are sampled and processed at a fixed rate that is typically 10 to 100 times the desired loop bandwidth. This value is subtracted from a reference value by a difference (or subtractor) 110 to produce an ERROR value.

The ERROR value is provided as input to a first multiplier 121 that multiplies the ERROR value by a constant Ki, that feeds an integrator 130, and the ERROR value is also provided to a second (proportional) multiplier 122 that multiplies the ERROR value by a constant Kp, to provide the proportional gain function. The integrator 130 accumulates successive values of its input. The output of the integrator 130 and the output of the proportional multiplier 122 are summed by summer 140, producing the current command value as output, which may be subsequently converted to an analog voltage to control an output current of a power stage (not shown) that converts the current command to the output voltage Vout. The bandwidth and phase margin of the closed control loop may be governed by the selection of the constants Kp and Ki.

Previous power supplies have often had to compromise between providing rapid transient response while limiting input current modulation. Therefore, there is a need in the industry to address one or more of the abovementioned shortcomings.

SUMMARY OF THE INVENTION

Embodiments of the present invention provide an apparatus and method for dynamic adjustment of the bandwidth of a power converter. Briefly described, the present invention is directed to a power converter that is configured to increase bandwidth in response to a magnitude of the difference between the target output voltage and the actual output voltage. The converter includes a subtractor to receive a reference voltage and a scaled output as inputs, configured to produce an error as output, a functional block configured to receive the error as input and to produce a functional block output, a first multiplier configured to receive the functional block output and scale the functional block output by a first loop constant, and a second multiplier configured to receive the functional block output and scale the functional block output by a second loop constant. The functional block is configured to increase the error value fed to the first multiplier and the second multiplier by a factor f(x).

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1:
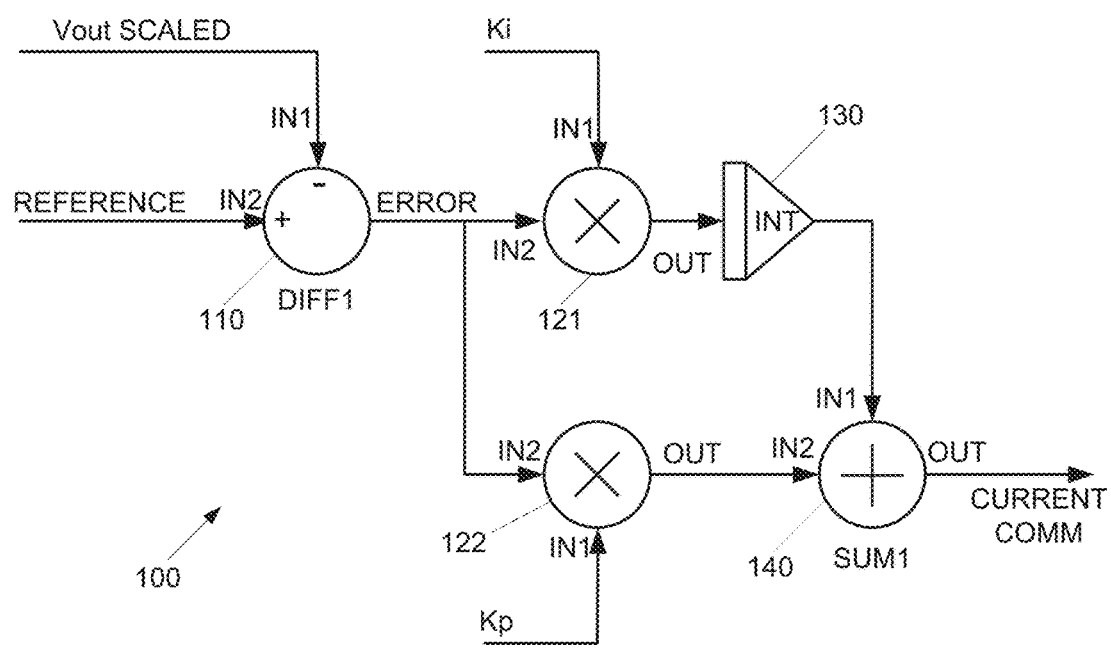
FIG. 1 is a diagram of a prior art control loop.

Reference will now be made in detail to embodiments of the present invention, examples of which are illustrated in the accompanying drawings. Wherever possible, the same reference numbers are used in the drawings and the description to refer to the same or like parts.

Embodiments of the present invention address the conflicting requirements for some power supplies for a rapid transient response while limiting input current modulation, for example, a power supply for a RADAR system. The embodiments provide for rapid transient load response while limiting input current modulation by dynamically changing the power converter bandwidth.

As noted in the Background section, previous power supplies have often had to compromise between providing rapid transient response while limiting input current modulation.

Figure 2:
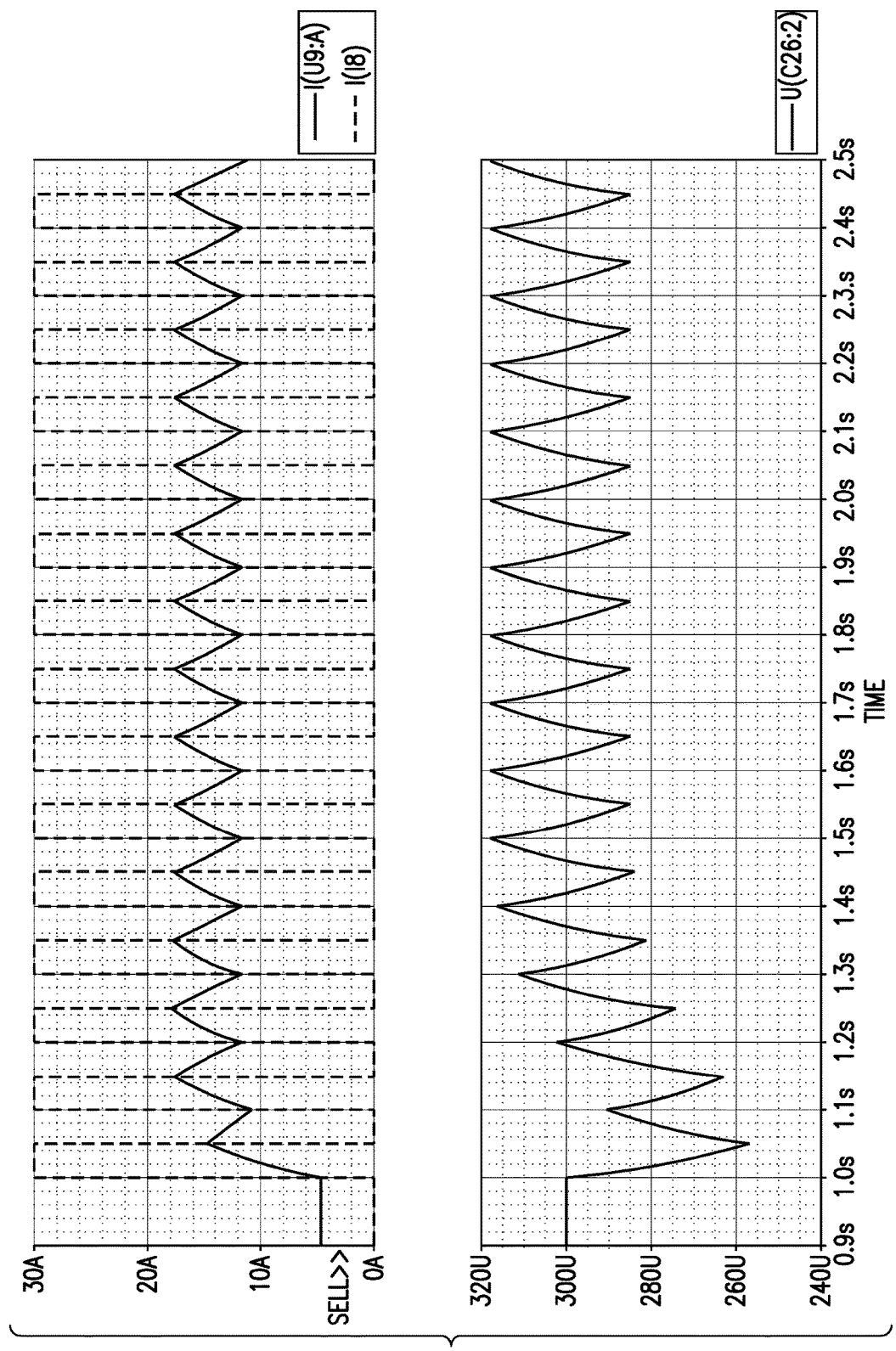
FIG. 2 is a pair of plot diagrams showing a simulated response of a converter using a prior art controller to a stream of load current pulses.

FIG. 2 shows the simulated response of a converter to a stream of load current pulses typical of a RADAR transmitter, although the described embodiments are not limited to RADAR applications. The upper plot shows the load pulses as a thick dashed line and the converter input current as a solid line, while the lower plot shows the converter output voltage. The individual load pulses in FIG. 2 may be, for example, the envelope of a train of separate shorter pulses.

As used herein, the term "transient response" is used to describe the response upon initiation of the pulse train, i.e., the first three or four pulses in FIG. 2, and the term "dynamic response" is used to describe the response to the pulse train once the transient response has settled out. A typical pulse train may contain many hundreds or thousands of pulses, of which only fifteen are shown in FIG. 2. The lower plot of FIG. 2 shows the output voltage of the converter deviating from its nominal value of 300V. The equipment that is fed by the power supply, RADAR equipment in this example, may have a minimum value below which it will not function, which is assumed to be 250 volts in this example, therefore the power supply must have sufficient bandwidth to prevent the output voltage dropping below this value when the pulse train is initiated at t=1.0 s in FIG. 2. The input current to the power converter is shown in the upper plot of FIG. 2, in solid line.

Another desired behavior for a typical RADAR power supply is to limit the degree of modulation of the input current during the dynamic response portion of the pulse train, especially when the power supply is fed from an aircraft or ground mobile generator, because the current modulation may have undesirable effects on the power generation and distribution system. The degree of input current modulation is proportional to the bandwidth of the power converter; therefore there are conflicting requirements for the selection of the bandwidth of the power converter; on one hand a high bandwidth is needed to meet transient output voltage requirements, while on the other hand a low bandwidth is needed to meet low input current modulation requirements. The load on the power converter typically includes a large energy storage capacitor to help in mitigating these conflicting requirements. However, by dynamically adjusting the bandwidth of the power converter, as per the embodiments herein, the value of the energy storage capacitance may be reduced, which may lead to a valuable cost savings and increase in reliability by reducing component count.

The exemplary embodiments disclosed herein disclose a device and method whereby the bandwidth of the converter is automatically increased when the voltage error is large, such as occurs during the transient response period illustrated in FIG. 2. This allows the base bandwidth, or the bandwidth operative during the dynamic response period, to be set to a low value commensurate with the input current modulation specification, and increase the bandwidth during the transient response period. Some solutions are known in which a signal is sent to the power supply to indicate that load is about to increase, and that the power supply should switch to a higher bandwidth for a fixed period, however most system designers are unwilling or unable to provide such a signal. Another solution has been to implement a switch inside the power supply when the voltage error exceeds a preset threshold, however these systems tend to chatter between the two bandwidths because the act of switching to a higher bandwidth tends to reduce the voltage error used to activate the switch. In contrast, the embodiments described herein provide a smooth and continuous transition between high and low bandwidths.

Figure 3:
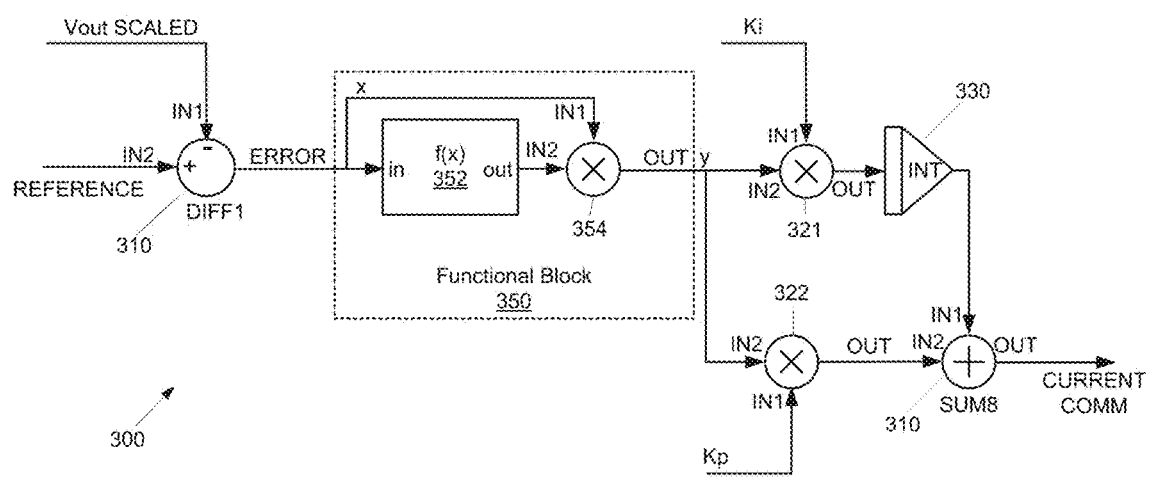
FIG. 3 is a diagram of an exemplary first embodiment of a control loop.

The prior art controller 100 shown in FIG. 1 directs the output (error) of the subtractor 110 to an input of a first multiplier 121 for input Ki and an input of a second multiplier 122 for input Kp. As shown by FIG. 3, a first exemplary embodiment of a converter controller 300 configured to dynamically alter the loop bandwidth includes a functional block 350 between the output of DIFF1 310 and the input to a first multiplier 321 for input Ki and a the input to second multiplier 322 for input Kp. This functional block 350 increases the apparent error value fed to the multipliers Ki and Kp by a factor f(x).

The characteristics of the factor f(x) may be implemented in one of several ways. For example, f(x) may either be always positive or always negative for all values of x, so that the sign of input x is not lost at the output y. f(x) may be a continuous function. f(x) may be a constant, or nearly so (substantially constant with small or negligible variations), for values of x having a magnitude between 0 and some predetermined value that represents the maximum value of x during the dynamic response period as previously described in FIG. 2, and increases for values of x having a magnitude greater than the predetermined value. f(x) may have a maximum value for large values of x in order to limit the maximum bandwidth during the transient response period as previously described.

Figure 4:
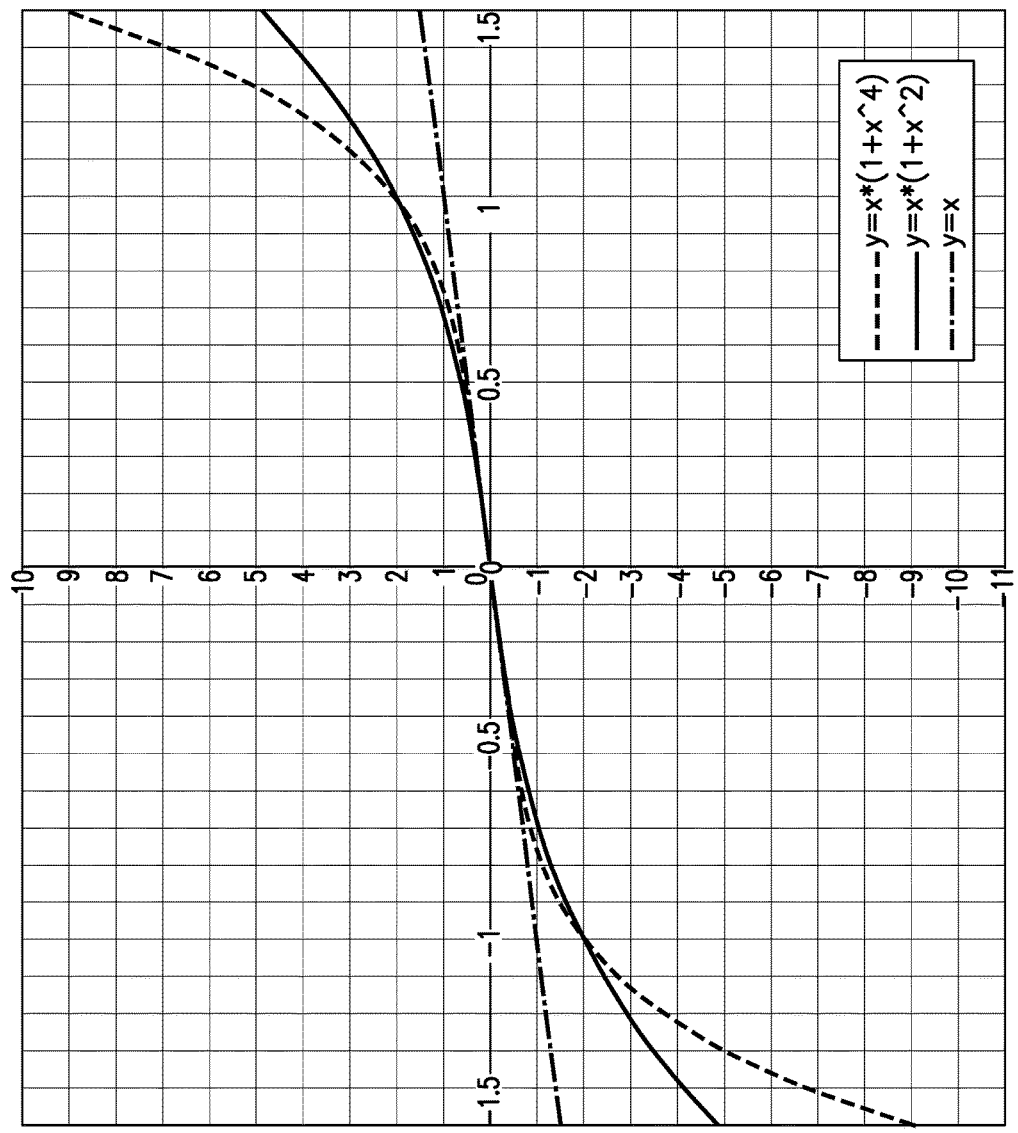
FIG. 4 is diagram plotting three exemplary transfer functions that may be implemented under the first embodiment of FIG. 3.

As an example, the functional block 350 may be implemented using the function $y = x(a+x^n)$, where y is the modified error value fed to the Ki and Kp multipliers, x is the input error value, n can be any even integer greater than 0, and a is a constant. In FIG. 4 the constant a is set to 1. FIG. 4 shows the transfer function $$y=x(1+x^n) \quad \text{(Eq. 1)}$$

for n=2 and n=4, along with the unmodified transfer function y=x. As FIG. 4 illustrates, the deviations of the second and fourth power functions from the unmodified y=x function are modest below x=1, and increase rapidly for x>1. If this breakpoint at x=1 in the transfer function is placed so that error values typical of the dynamic response fall below the breakpoint, and error values typical of the transient response fall above the breakpoint, the object of the invention are achieved. The appropriate selection of the constant a in the function $$y=x(a+x^n) \quad \text{(Eq. 2)}$$

allows the breakpoint in the function to be aligned so that error values x associated with the dynamic response shown in the lower plot of FIG. 2 are placed below the breakpoint, and error values associated with the transient response are placed beyond the breakpoint, and so are amplified disproportionately relative to dynamic errors. The break point occurs at $x=a^{(1/n)}$. In the subsequent discussion only the n=2 case is considered.

Figure 5:
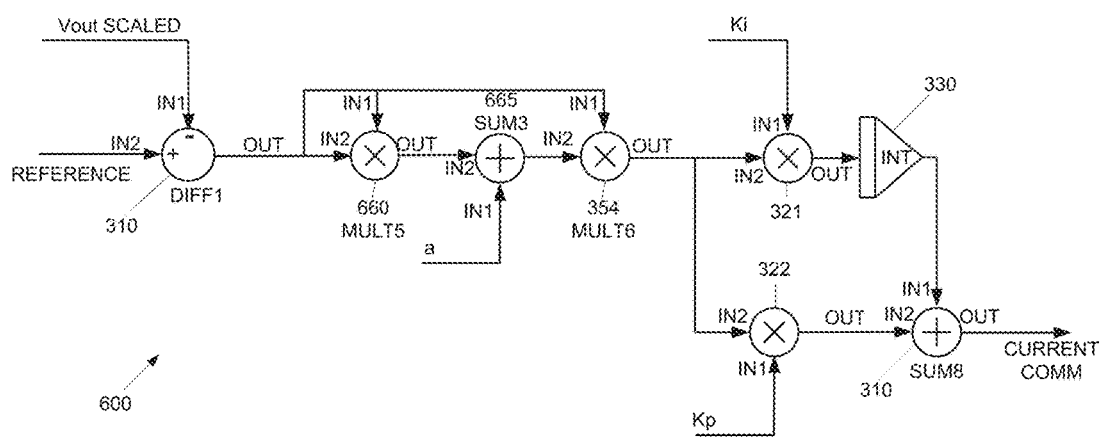
FIG. 5 is a diagram of an exemplary second embodiment of a modified PI control loop.
Figure 6:
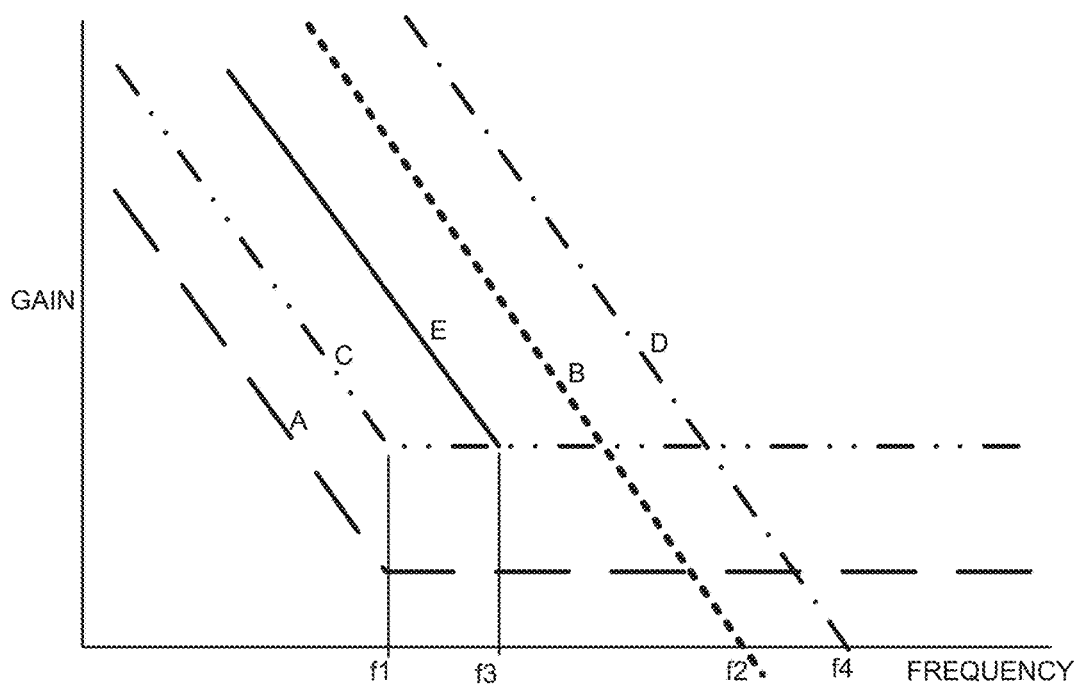
FIG. 6 is a diagram showing the gain-frequency plots for several conditions under the first embodiment.

FIG. 5 illustrates the modified control loop 600. Multipliers 660 and 354, and a summer 665 have been inserted into the loop to execute the function $$x(a+x^2), \quad \text{(Eq. 3)}$$

however the response of the system is not optimal, as is demonstrated in FIG. 6.

FIG. 6 shows the gain-frequency plots for several conditions under the first embodiment. For example, assume the compensation offered in the base bandwidth case is as shown by curve A in FIG. 6, having a zero at frequency f1, and the resultant closed loop response is as shown by curve B, having a unity gain bandwidth f2. The phase margin of the system may be determined by the ratio f2/f1, and f1 is usually chosen so that the time domain response is approximately critically damped. If the increase in gain resulting from a large error value causes curve A to shift up to curve C, curve B will shift to curve D resulting in increased bandwidth f4. However, the zero of curve C remains unchanged at f1, resulting in an increase in phase margin and a sluggish over-damped time domain response. Ideally, the sloping portion of curve C moves to curve E so that the ratio of bandwidth to zero frequency remains unchanged. This leads to a modification to the second embodiment that increases the gain of the integral path of FIG. 4 more than the proportional path.

Figure 7:
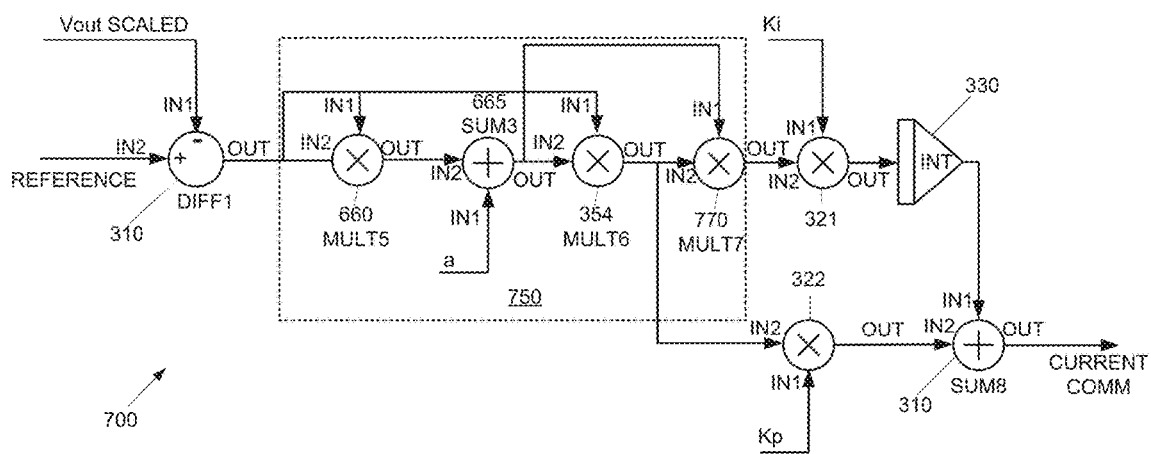
FIG. 7 is a diagram of an exemplary third embodiment of a modified PI control loop.

For the transfer function $$y=x(a+x^2), \quad \text{(Eq. 4)}$$

the input error is modified by a factor $(a+x^2)$. Since the slope of curves B and D are ideally −1, the proportional shift between the curves B and D is the same along the x axis as it is along the y axis, therefore it follows that modifying the integral path by a factor of $((a+x^2)^2)$ achieves the goal of shifting curve C to curve E so that f4/f3=f2/f1, resulting in an optimally compensated control loop at all bandwidths. The improved circuit is illustrated in FIG. 7 where a multiplier MULT7 770 has been added to provide the additional factor of $a+x^2$ in the Ki branch of the PI loop. Specifically, the multiplier MULT7 770 receives a first input from the output of SUM3 665 and a second input from the output of MULT6 354, and produces an output that is received as a second input by the first multiplier 321. The circuit 700 may be implemented as an analog circuit using analog multipliers and operational amplifiers, or more simply by firmware executed in a microcontroller, as described further below.

Figure 8:
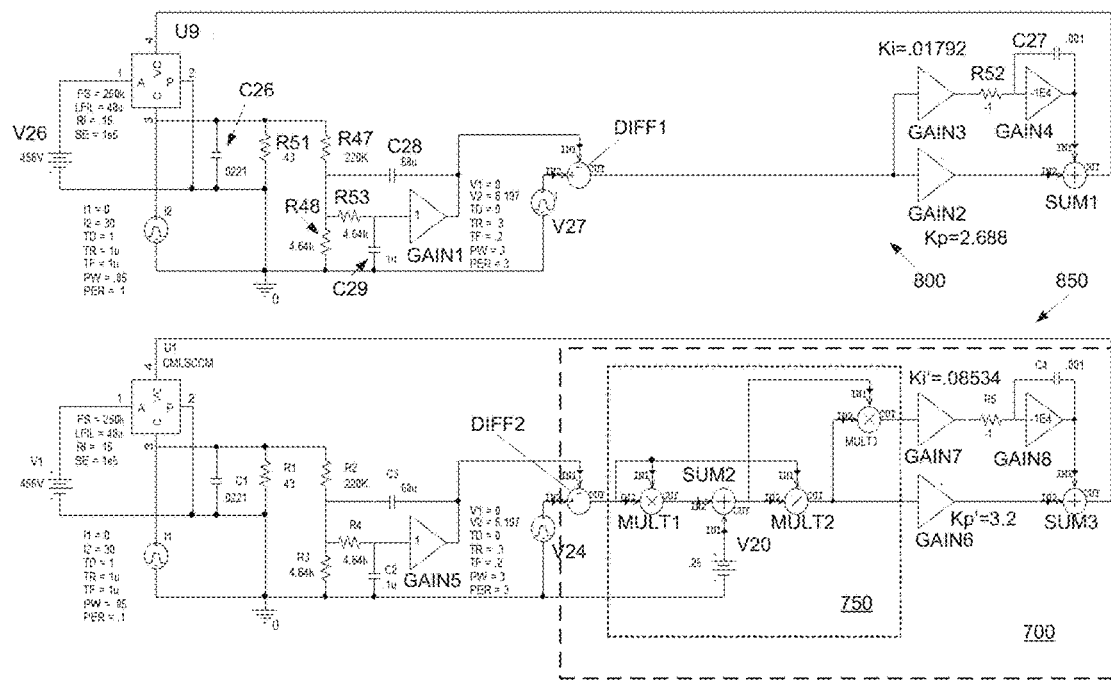
FIG. 8 is a diagram of a PSpice model for an unmodified power converter (800) and a modified power converter based upon a hardware implementation of the third embodiment (850).

The utility of the second embodiment may be verified via simulation, for example, by PSpice simulation. FIG. 8 shows two PSpice (software simulated) models 800, 850 of an unmodified power converter for the control loop of FIG. 7. The upper circuit 800 shows a power converter having an output voltage of 300 volts including U9, an averaged model for a current mode switch in continuous conduction that includes the output inductor, output capacitor C26, resistive divider R47 and R48, anti-aliasing Sallen-Key filter GAIN1/R53/C28/C29, reference voltage V27, voltage comparator DIFF1, and PI controller including proportional gain stage GAIN2, integral gain stage GAIN3, integrator R52/GAIN4/C27, and summer SUM1. The reference voltage V27 ramps up to its final value over 0.3 s to assist in simulation convergence. The integrator of FIG. 7 is modeled by PSpice in FIG. 8 (upper circuit) as a conventional analog integrator with a time constant equal to the sampling period of the digital integrator, 1 ms. R52 is set to a negative value so that the integrator is non-inverting. The loads on the converter may be, for example, a fixed load over R51 of 7 A, and a pulsed load I1 of 30 A amplitude and 50 ms duration repeating every 100 ms. The PI loop constants, Kp and Ki, may be, for example, set to yield a loop bandwidth of 3 Hz.

The lower circuit 850 shows the same converter with the functional block 750 of the controller 700 of FIG. 7 incorporated. V20, which models the constant a in FIG. 7, is set to 0.25V, implying a break point at $x=\sqrt{0.25}=0.5$. The PI loop constants Kp' and Ki' have been set for a base bandwidth of approximately 1 Hz.

Figure 9:
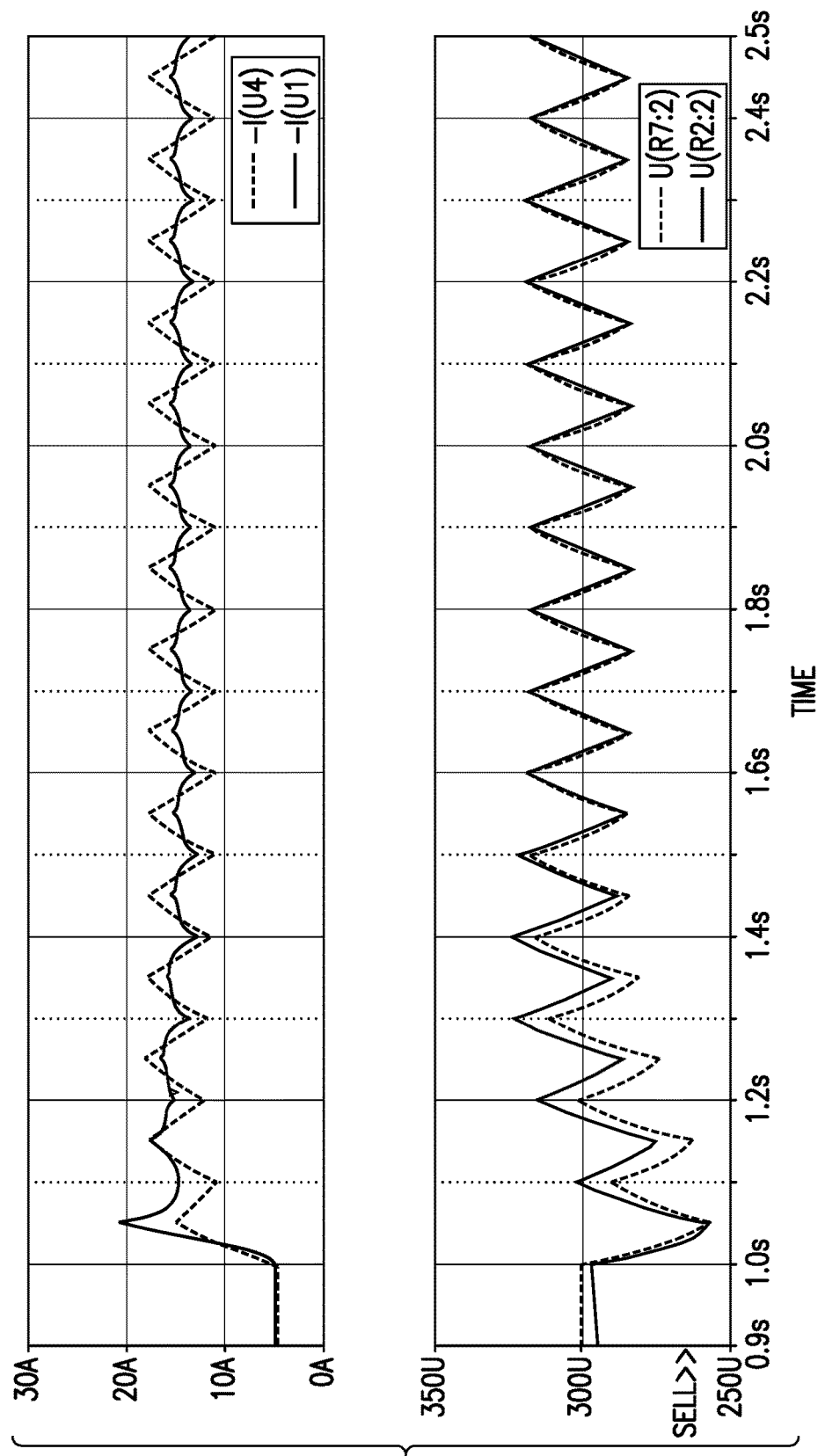
FIG. 9 is a pair of plot diagrams showing simulated responses of the converters of FIG. 8.

FIG. 9 shows the simulated response of the two converters 800, 850 of FIG. 8; the upper plot shows the converter input current, and the lower plot shows the output voltage. The dashed traces show the unmodified converter, and the solid traces show the modified converter.

The lower plot shows that the two converters have equivalent transient response in that the lowest output voltages of the two converters are the same. The dynamic output voltage responses once the transients have settled out are essentially the same for both converters. This is because the pulse repetition frequency is well beyond the bandwidth of the converters, so the dynamic response is governed by the magnitude of the output capacitor.

The upper plot of FIG. 9 showing solid lines for converter 800, and dotted lines for 850 indicates that the input current modulation once the transient has settled is greatly reduced for the modified converter. The input current modulation measures 6.63 A peak-to-peak for the unmodified converter, and 2.14 A for the modified converter. These are ±23.1% and ±7.5% respectively of the average current, demonstrating a three to one reduction, in line with the reduction in the base bandwidth from 3 Hz to 1 Hz.

Figure 14:
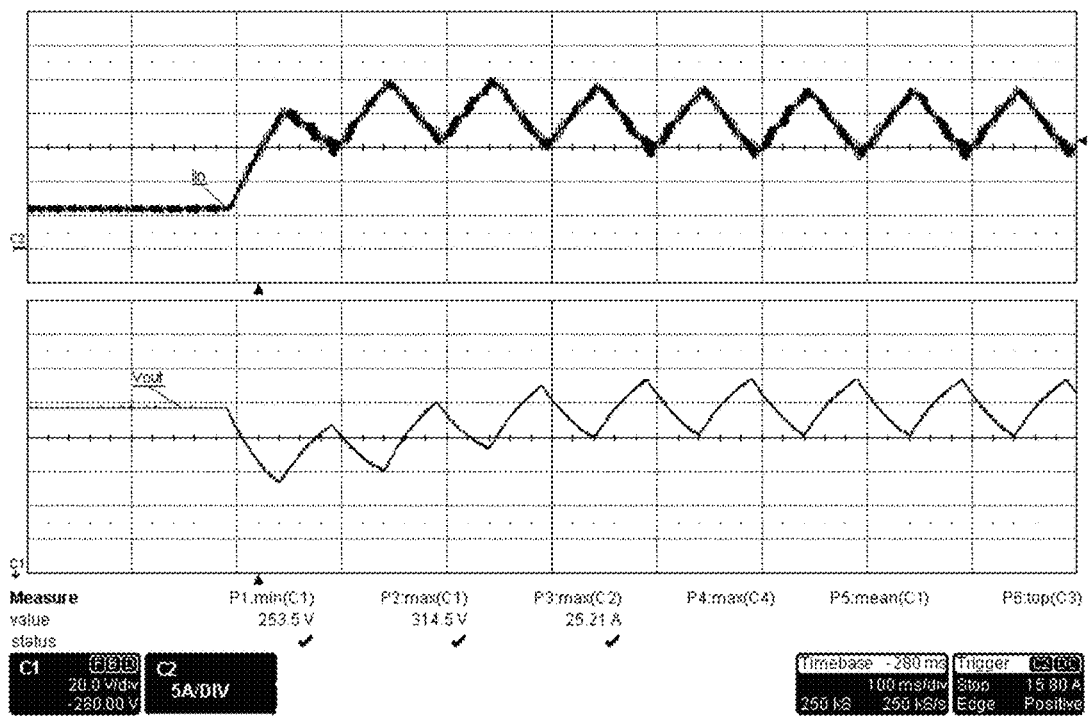
FIG. 14 is a plot diagram showing measured results of an unmodified converter.

The first, second, and third embodiments may be implemented, for example, by leveraging existing PID firmware code which produced the unmodified converter response shown in FIG. 14. At each sampling interval (approximately 1 kHz rate), the analog-to-digital (not shown) converter digitizing Vout SCALED may be polled and the output voltage Vout SCALED is digitized into, for example, a 12-bit value. This value is compared with the target output voltage and generates a signed error value which is stored as, for example, a 32-bit integer for subsequent math operations.

The firmware may be configured to maintain the gain values of Kp and Ki in non-volatile memory which it uses to then scale the error signal as shown in FIG. 7. The INT block 330 (FIG. 7) represents an integrator which accumulates the resulting value each sampling interval and having upper and lower saturation bounds to counteract integrator wind-up. The resulting commanded current is right shifted to put it within a 16-bit value range which is transmitted to the digital-to-analog converter to update the commanded current set-point. The read-calculate-write cycle completes within the 1 ms sampling period.

Figure 10:
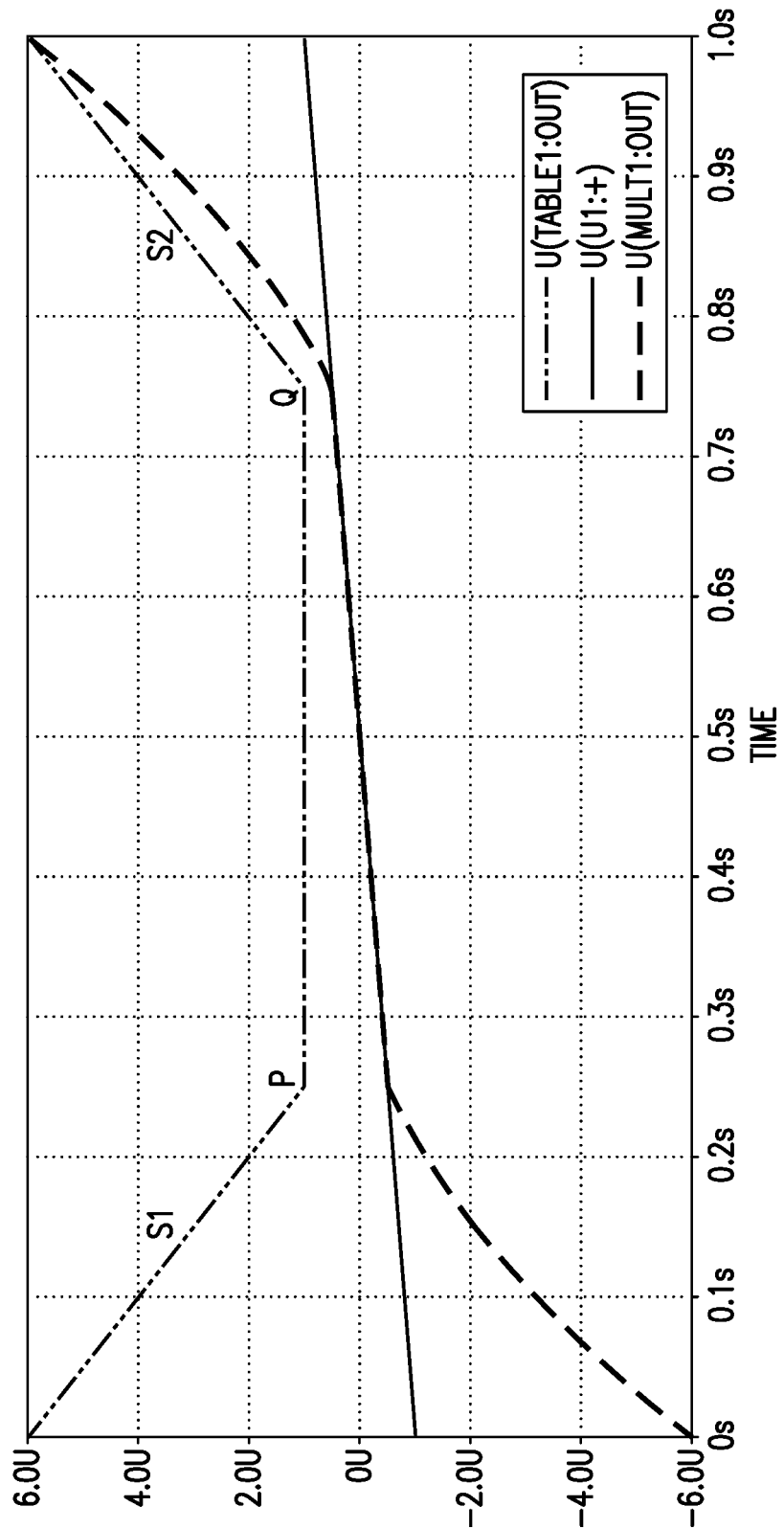
FIG. 10 is a diagram of a piecewise transfer function implementation of the first embodiment.

In another embodiment, the function f(x) may be set to a piecewise linear function that entirely eliminates any gain variation in the steady state dynamic portion of the response, that is, the right hand portion of FIG. 9, after the initial transient has settled out. Such a function is simple to implement in firmware. FIG. 10 is a PSpice simulation modeling a function f(x) set to a piecewise linear function that shows the transfer function having break points at x=P and x=Q and slopes S1 and S2; the input x is shown by the solid trace varying from −1 to +1 over time, f(x) is shown by the dashed trace and is equal 1 for |x|<0.5, rising linearly to 6 for |x|>0.5 and <1. The resultant y=x*f(x) is shown by the dotted trace. Although FIG. 10 shows P=−Q and S1=−S2, it is not necessary for them to be so.

Figure 11:
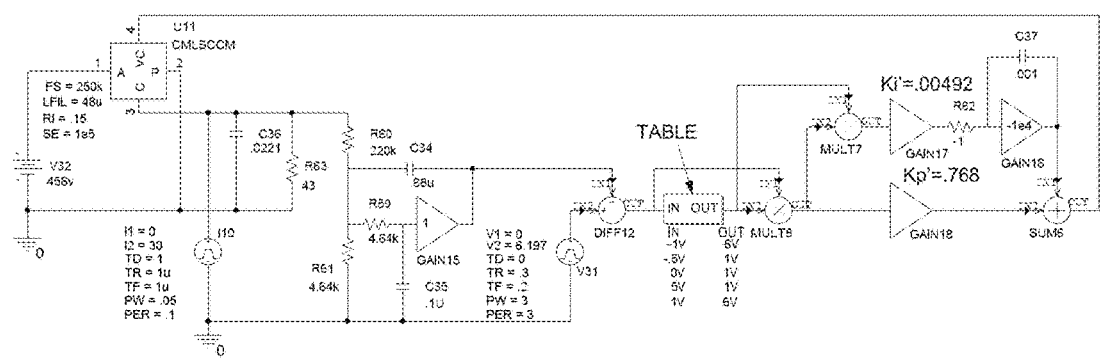
FIG. 11 is a diagram of a PSpice model for a piecewise linear function implementation of the first embodiment.

FIG. 11 shows a PSpice model for the same power converter previously described integrating the function f(x) set to a piecewise linear function. This schematic is identical to the lower schematic in FIG. 8 except that MULT1 and SUM2 in FIG. 8 have been replaced by a TABLE function in FIG. 11, and values of Kp' and Ki' are used in place of Kp and Ki (FIG. 8).

Figure 12:
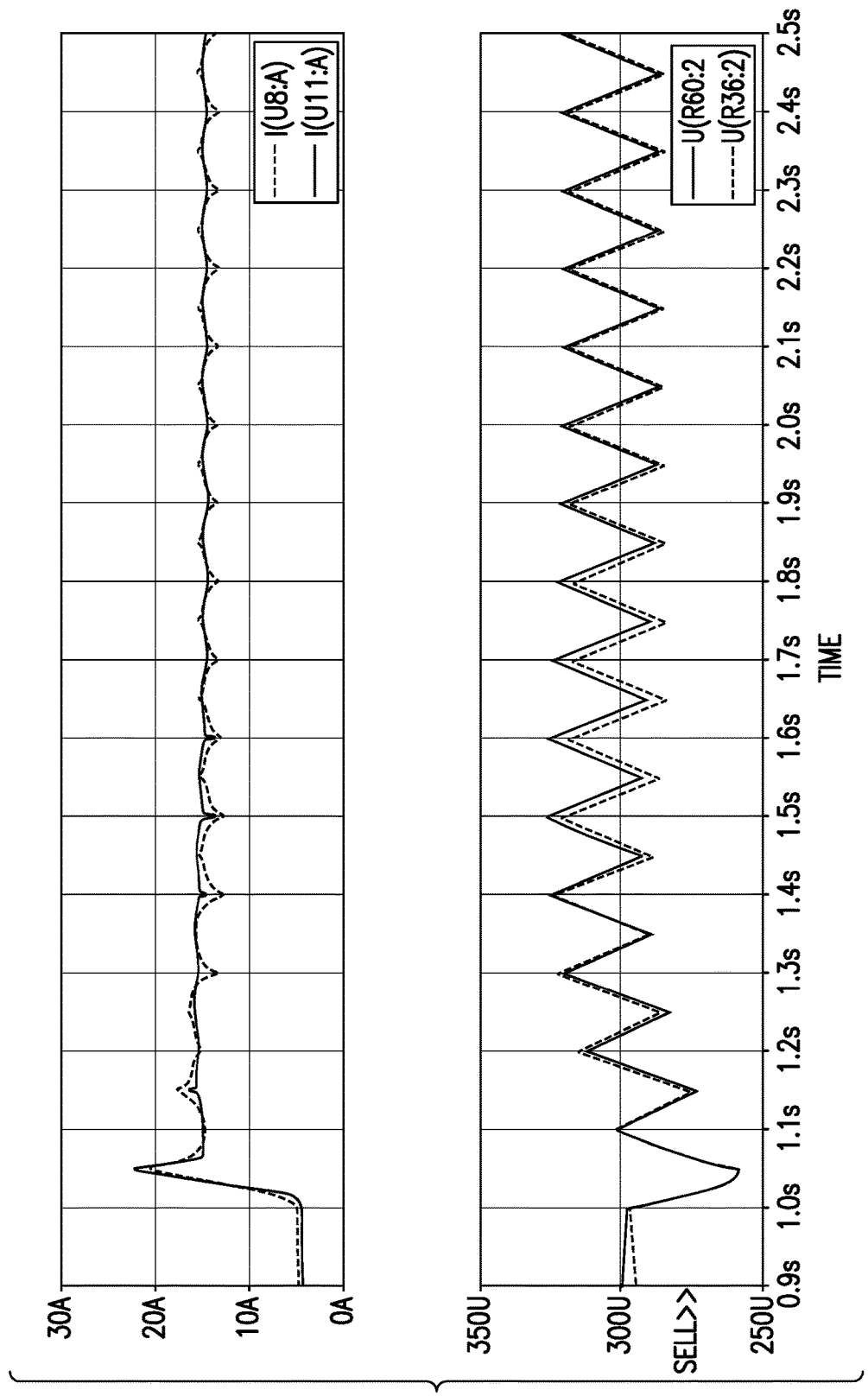
FIG. 12 is a pair of plot diagrams showing a simulated response of the converter of FIG. 11 and the converter 850 of FIG. 8.
Figure 13:
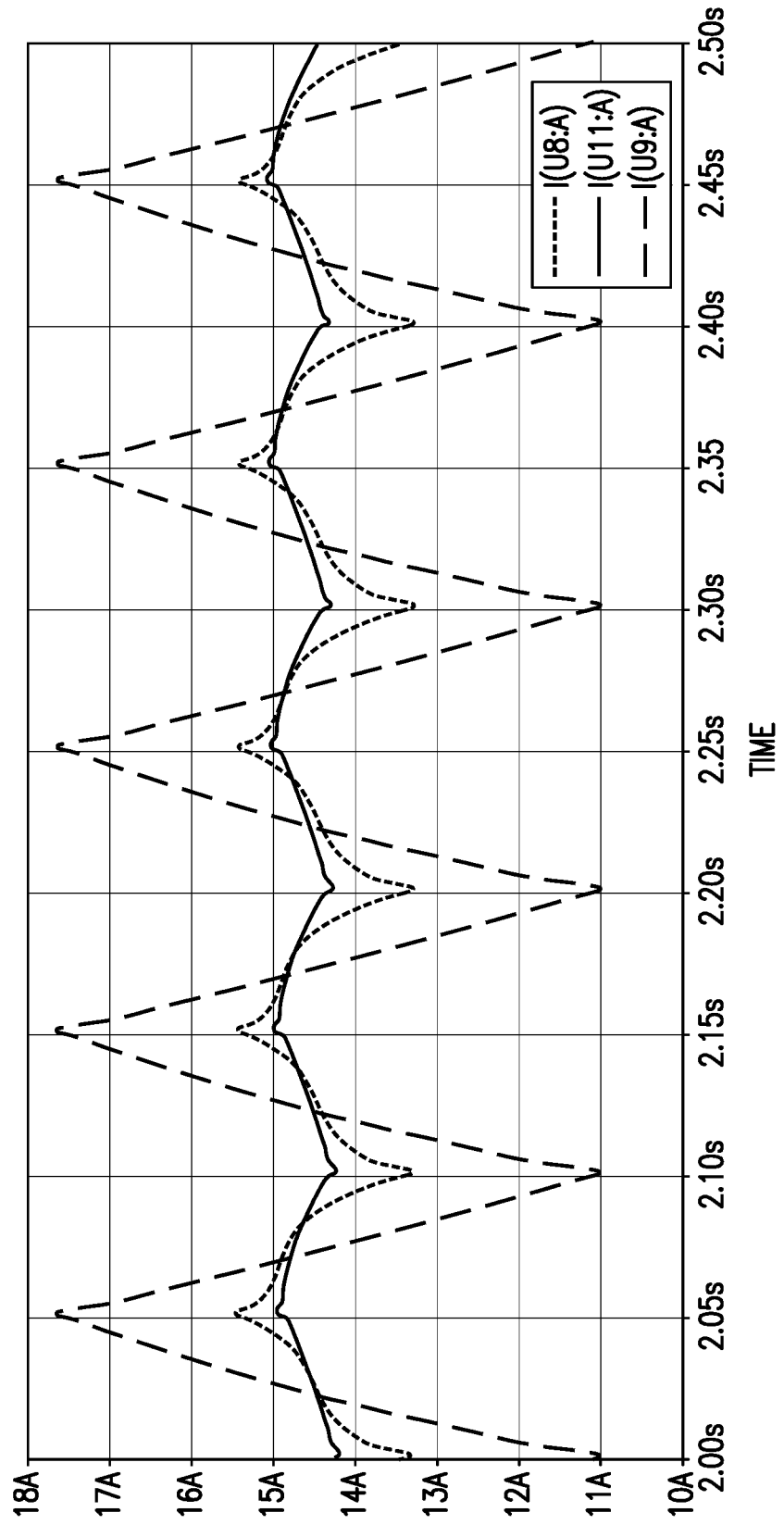
FIG. 13 is a plot diagram showing an input current comparison of the converter of FIG. 11, the converter 850 of FIG. 8, and the unmodified converter 800 of FIG. 8.

The results of the simulation of FIG. 11 are shown as the solid traces in FIG. 12, along with the result of the previous simulation for comparison, the solid trace in FIG. 9, which is shown as the dashed trace in FIG. 12. FIG. 13 shows an expanded view of the dynamic portion of the input currents for the cases of the fixed bandwidth converter and the two example converters described herein, illustrating that the peak-to-peak current modulation has been reduced from 6.63 A to 2.14 A, and finally to 0.735 A for the piecewise linear function. The unmodified converter 800 current waveform is the solid trace in FIG. 12, the converter 850 current waveform is the dashed trace in FIG. 12, and the FIG. 11 current waveform is the dotted trace in FIG. 12.

The embodiment shown in FIG. 11 may be implemented in firmware as in the previous example. The break point constants P and Q, and the slope constants S1 and S2 (see FIG. 10) may be stored in non-volatile memory. The value of f(x) may be evaluated by subtracting the constant P (in FIG. 10) from the current value of x. If the result is negative, f(x) may be calculated as (x−P)*S1, where S1 is the slope constant of the right hand part of the piecemeal linear function. If x−P is positive, then x−Q may be calculated. If x−Q is negative, then f(x) may be set to 1, which is the value of the center part of the piecewise linear function. If x−Q is positive, f(x) is calculated as (x−Q)*S2, where S2 is the slope constant for the right hand part of the piecewise linear function.

FIG. 14 shows the measured response of the unmodified converter; the upper trace shows the input current, and the lower trace shows the output voltage. The upper current trace exhibits superimposed high frequency noise from residual switching current present on the DC input lines. The measured results are in good agreement with the simulation, thus validating the simulation model. There is a difference in the scaling of the input current between the simulation and the measured response because the simulation model does not account for the turns ratio of the converter transformer or the power loss in the hardware.

Figure 15:
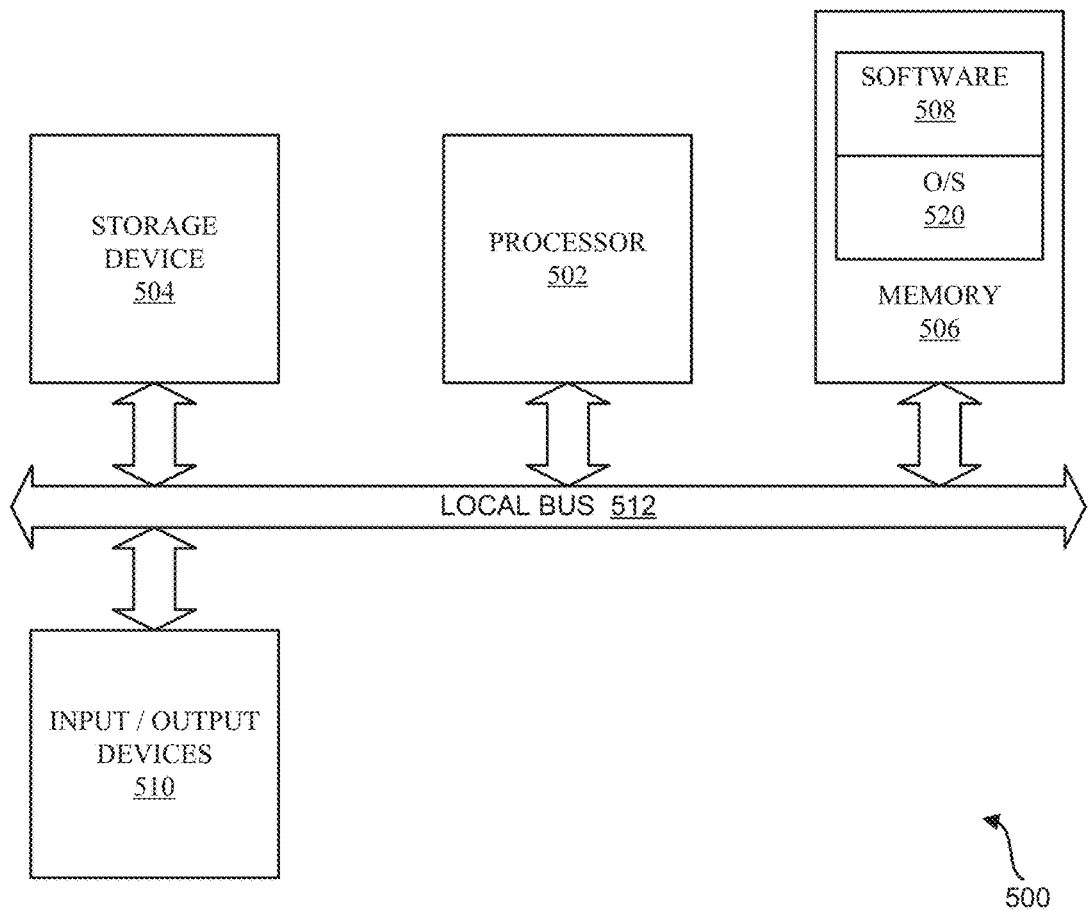
FIG. 15 is a schematic diagram illustrating an example of a system for executing functionality of the present invention.

The system for executing the present functionality described in detail above may be a computer, an example of which is shown in the schematic diagram of FIG. 15. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 16:
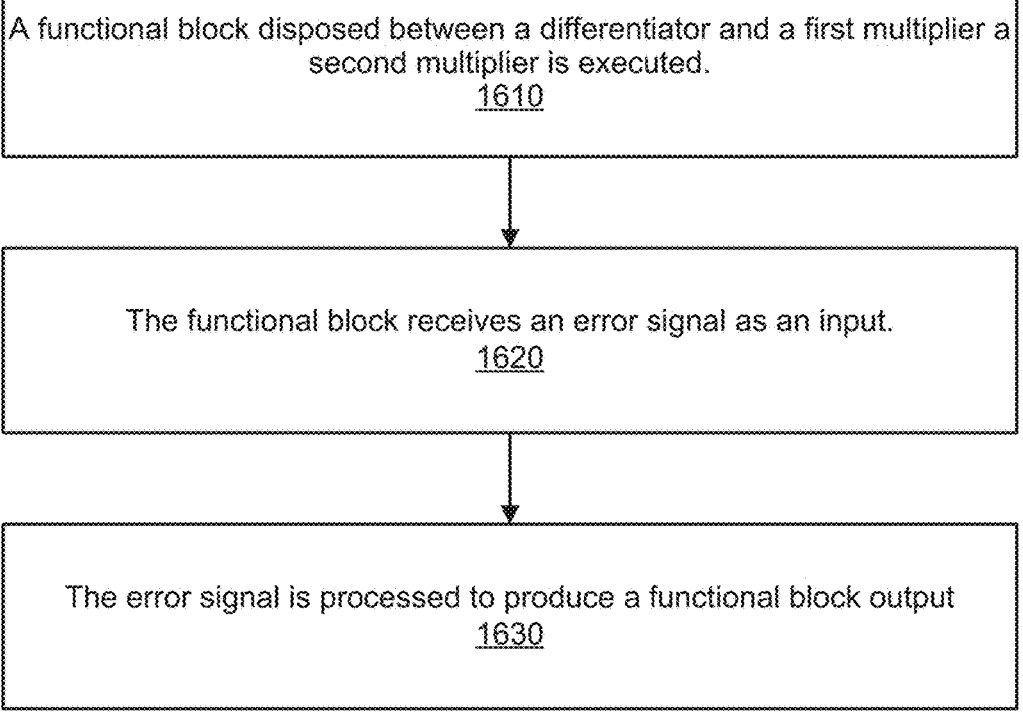
FIG. 16 is a flowchart illustrating a method for increasing bandwidth of a power converter.

FIG. 16 is a flowchart illustrating a method for increasing bandwidth of a power converter in response to a magnitude of the difference between the target output voltage and the actual output voltage, the power converter including a subtractor receiving a reference voltage and a scaled output as inputs, configured to produce an error as output, a first multiplier configured to receive the error output and scale the functional block output by a first loop constant, and a second multiplier configured to receive the error output and scale the functional block output by a second loop constant, It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As shown by block 1610, a functional block disposed between the subtractor and the first and second multipliers is executed. The functional block receives the error as an input, as shown by block 1620. The error is processed to produce a functional block output, as shown by block 1630. The operation of the functional block is described above.

The above embodiments may be implemented as firmware executed in a microcontroller and/or by analog circuits. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power converter configured to increase bandwidth in response to a magnitude of a difference between a target output voltage and an actual output voltage, comprising:
    a subtractor to receive a reference voltage and a scaled output as inputs, configured to produce an error as output;
    a functional block configured to receive the error as input and to produce a functional block output;
    a first multiplier configured to receive the functional block output and scale the functional block output by a first loop constant; and
    a second multiplier configured to receive the functional block output and scale the functional block output by a second loop constant,
    wherein the functional block is configured to increase an error value fed to the first multiplier and the second multiplier by a factor f(x) over a first range of error values below zero and a third range of error values above zero, and for error values over a second range of error values between the first range and the third range, a ratio of the bandwidth to the error value remains substantially unchanged, the second range selected for error values having a magnitude below a predetermined value selected to limit the bandwidth during a transient response.

2. The power converter of claim 1, wherein the functional block further comprises a third multiplier receiving the error as a first input and the output of the factor f(x) as a second input, and produces the functional block output.

3. The power converter of claim 1, wherein the factor f(x) is configured to be positive for all values of the error, so that a sign of the error value is not lost at the functional block output.

4. The power converter of claim 1, wherein the factor f(x) is configured to be negative for all values of the error, so that a sign of the error value is not lost at the functional block output.

5. The power converter of claim 1, wherein the factor f(x) is configured as a continuous function.

6. The power converter of claim 1, wherein the factor f(x) is configured as a piecewise transfer function with regard to the first range, the second range, and the third range.

7. The power converter of claim 1, wherein for the first range and the third range, the factor f(x) is configured to have a maximum value for a predetermined maximum value of the error.

8. The power converter of claim 1, wherein the functional block is configured to implement the transfer function $y=x(a+x^n)$, wherein x is an input current error value, a is a constant error value, y is an output current error value, and n is 2 or 4.

9. A method for increasing bandwidth of a power converter in response to a magnitude of a difference between a target output voltage and an actual output voltage, the power converter comprising a subtractor receiving a reference voltage and a scaled output as inputs, configured to produce an error as output, a first multiplier configured to receive the error output and scale a functional block output by a first loop constant, and a second multiplier configured to receive the error output and scale the functional block output by a second loop constant, the method comprising the steps of:
executing a functional block disposed between the subtractor and the first and second multipliers;
receiving the error as input; and
processing the error to produce the functional block output,
wherein the functional block is configured to increase an error value fed to the first multiplier and the second multiplier by a factor f(x) over a first range of error values below zero and a third range of error values above zero, and for error values over a second range of error values between the first range and the third range, a ratio of the bandwidth to the error value remains substantially unchanged, the second range selected for error values having a magnitude below a predetermined value selected to limit the bandwidth during a transient response.

10. The method of claim 9, wherein the processing the error further comprising the steps of:
receiving the error as a first input;
receiving an output of the factor f(x) as a second input; and
scaling the first input by the second input to produce the functional block output.

11. The method of claim 9, wherein the factor f(x) is configured to be positive for all values of the error, so that a sign of the received error output is not lost at the functional block output.

12. The method of claim 9, wherein the factor f(x) is configured to be negative for all values of the error, so that a sign of the received error output is not lost at the functional block output.

13. The method of claim 9, wherein the factor f(x) is configured as a continuous function.

14. The method of claim 9, wherein the factor f(x) is configured as a piecewise transfer function.

15. The method of claim 9, wherein the factor f(x) is configured to be a constant, or nearly so, for values of the error having a magnitude between 0 and a predetermined value, and increases for values of the error having the magnitude greater than the predetermined value.

16. The method of claim 9, wherein the factor f(x) is configured to have a maximum value for a predetermined maximum value of the error.

* * * * *